Oct. 26, 1937.  F. C. ATWOOD  2,097,054
ACOUSTICAL COMPOSITION
Filed June 3, 1933

Inventor.
Francis Clarke Atwood
by J. Stanley Churchill
Atty.

Patented Oct. 26, 1937

2,097,054

UNITED STATES PATENT OFFICE 2,097,054

ACOUSTICAL COMPOSITION

Francis Clarke Atwood, Newton, Mass., assignor to Atlantic Research Associates, Inc., Portsmouth, N. H., a corporation of New Hampshire Application June 3, 1933, Serial No. 674,201

7 Claims. (Cl. 106—18)

This invention relates to a plastic composition and to a coating material.

One object of the invention is to provide a novel and superior plastic composition possessing improved bonding and cohesive properties which may be colored in a uniform and superior manner and which is highly useful for various purposes such as the production of molded products and the like.

Another object of the invention is to provide a novel and superior coating material capable of application in plastic form to a surface, which possesses improved bonding and cohesive properties and whose composition is such as to facilitate the coloring of the coating material in a uniform and superior manner.

A further object of the invention is to provide a novel and superior acoustical plaster possessing improved bonding and cohesive properties which when applied to a surface is adapted to provide the same with a more efficient and desirable sound absorbing coating than other acoustical plasters now upon the market and of which I am aware.

With these general objects in view, the invention consists in the coating materials hereinafter described and particularly defined in the claims at the end of this specification.

Figure 1:
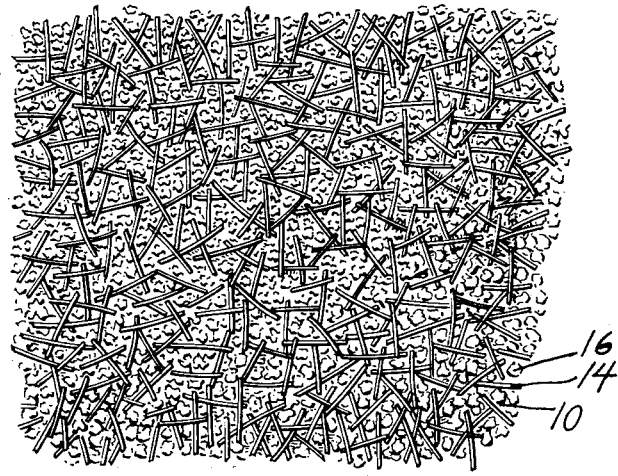
Figure 2:
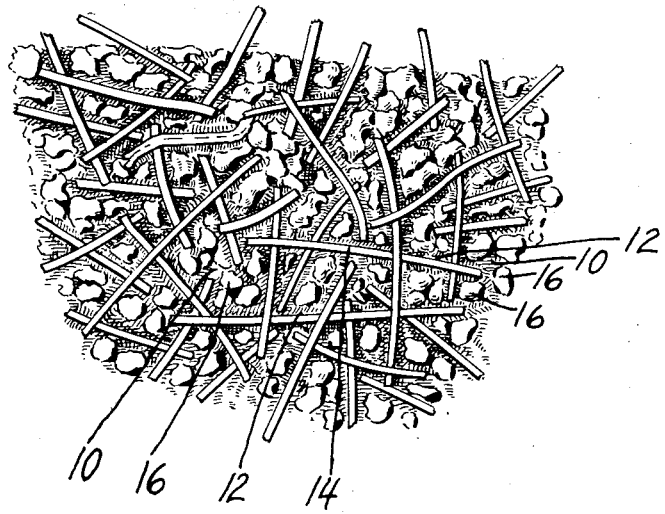

In the drawing, Fig. 1 illustrates an enlarged vertical section of a portion of a wall or ceiling to which the present acoustical plaster has been applied; and Fig. 2 is an enlarged similar view of the wall or ceiling shown in Fig. 1.

Various acoustical plasters have been heretofore proposed comprising granular material bound together by cementitious material. In order to impart porosity to the material the cementitious binder has had incorporated therein either gas forming elements or foam producing elements. The gas forming elements tend to produce a more uniform porosity in the resulting plaster of a character very difficult to control preventing the attainment of the desired degree of sound absorption in all cases. The foam producing agents tend to form a myriad of small bubbles which by themselves decrease the strength of the plaster very materially and decrease its adhesive properties. In some instances the small bubbles may even permit the plaster to set without breaking, and as a result the porosity imparted to the plaster by this character of foaming agent does not produce a continuity of interconnecting spaces or interstices throughout the body of the plaster so necessary for most efficient sound absorption.

In its preferred form the present invention contemplates the production of a highly efficient sound absorbing coating or acoustical plaster, and it has been found that by controlling the character and shape of the individual granular particles making up the aggregate and by the use of special cementitious materials, an acoustical plaster may be produced possessing greatly increased strength and bonding ability as well as an increased efficiency in the absorption of sound waves uniformly over a wide range from low to high frequency. Many of the acoustical plasters now upon the market possess fair absorption at one frequency but none of them, as far as I am aware, are capable of absorbing sound efficiently over wide ranges of frequencies.

In its broader aspects the invention contemplates a coating composition having superior bonding and cohesive strength and also one having unusual color holding ability, thus enabling the production of colored coatings for walls, ceilings, and other surfaces in which the color is uniform over the entire surface, thus contributing to the decorative and commercial value of the coating composition.

In producing the present coating composition I prefer to utilize a special dolomitic material as the aggregate or as a principal part of the aggregate, and in a degree of sub-division according to the particular use for which the coating material is intended. The dolomitic material which I prefer will be hereinafter referred to as "core" and is characterized particularly by its ability to retain its volume relation after being wet with water so that under conditions of use it does not disintegrate nor does it shrink either before or after setting. As a matter of fact the dolomitic material tends to increase slightly in volume, thus counteracting any tendency of the cementitious binding material to shrink. The present dolomitic material contributes to the economical production of a coating composition in which such material is used as the aggregate, by reason of the increase in adhesiveness imparted to the resulting coating composition, and as a result while most acoustic plaster compositions require from 30 to 35% of a finely ground cementitious material, the use of the present dolomitic material enables comparative strengths of coating compositions to be produced using from 20 to 25% of cementitious material.

The special dolomitic material referred to comprises a form of limestone containing magnesium carbonate and calcium carbonate. It is characteristic of this material that no matter how fine the particle of dolomite, it still contains calcium and magnesium carbonates. By calcining a dolomite of the character referred to between the temperatures of 350° C. and 850° C., the magnesium carbonate is decomposed liberating carbon dioxide, while within this range of temperature substantially no decomposition of the calcium carbonate takes place, and as a result a partially calcined dolomite is produced, possessing characteristics, as will be described, which lend themselves particularly to the particular use among others, as an aggregate in the production of an acoustical plaster. The calcined product produced as described may for convenience be herein referred to as "core", and an important characteristic of the "core" resides in the fact that each particle irrespective of its size carries some calcium carbonate and some magnesium oxide. Calcium carbonate is quite insoluble in water and magnesium oxide is also insoluble in water, and while the magnesium oxide may hydrate, this does not tend to remove it from its association with calcium carbonate in each particle because of the very low solubility of the magnesium oxide. As a result of the chemical composition, each particle of "core" therefore has the superficial surface characteristics of magnesium oxide but is physically inert as far as swelling or shrinkage is concerned because of the inactive calcium carbonate. An important characteristic of the magnesium oxide content of each particle resides in its ability to hold color, and in this connection it appears to act as a mordant for the color. Because of the relative insolubility of the magnesium oxide, together with the fact that when hydrated, it becomes very plastic, and contributes to the retention of strength of the granules, without breaking down in water. The magnesium oxide also appears to assist in cementing together adjacent particles.

I have experienced particularly good results using those dolomitic deposits having a most crystalline character, particularly for the production of aggregates for acoustic materials. When such crystalline dolomites are calcined to form the "core" within the temperature limits above referred to, the crystalline material of the "core" is loosely bound together and may be broken down into its normal crystalline size by the application of very slight mechanical pressure or work. The crystals themselves are fairly strong and are not easily broken into small particles, and for this reason I have found this material to be particularly valuable for use as an aggregate for an acoustical plaster or other acoustical material. The granules produced upon the reduction of the "core" are extremely uniform in size and furnish an aggregate which may be much more accurately graded than is possible to produce economically with other materials of which I am aware. For example, for the production of acoustical plaster, I have been able to produce an aggregate in which the particles are sharply graded between say a 14-mesh screen and a 20-mesh screen, obtaining a yield of from 60 to 70% between these meshes from those crystalline dolomite "cores" with which I have experimented.

To recapitulate, it will be observed from the foregoing that an aggregate produced from the present dolomitic material lends itself to ease of grading, that the particles possess superior color holding properties, that the aggregate is not only strong and minutely porous and possesses improved cementing properties, but also that it may be economically and cheaply produced. By reason of the surface coating of the magnesium oxide or hydrate upon each particle and which in itself possesses cementing properties, I am able to produce an acoustical material in which the strength tends to increase as time goes on by reason of the conversion of the magnesium oxide or hydrate into carbonate. The most desirable character of dolomite with which I have thus far experimented comprises that obtained from deposits in the Berkshire Hills and in the Appalachian chain of mountains extending through western Massachusetts, Connecticut and eastern New York, although of course other deposits may be used.

I prefer to utilize calcined gypsum because of its economy and convenience, but I have also found it desirable to modify the effect of the calcined gypsum by the addition of an agent capable of modifying the surface tension of the wet cementitious material. It is preferred to use with the calcined gypsum binder a small amount of gum arabic or other similar vegetable gums and substances such as rosin, magnesium oxide and a substance commercially obtainable under the name of "Capolene", and, if desired, a small amount of finely ground "core" may also be used with advantage, to help in preventing shrinkage of the plaster when drying. As an example of a practicable cementitious composition, for my purpose I may use:—

| | Per cent |
|---|---|
| Calcined gypsum | 80 |
| Gum arabic | 2 |
| Finely ground "core" | 18 |

As a result I have found it possible to produce an acoustical composition or material utilizing the aggregate above referred to and the modified calcined gypsum binder, of a nature such as to bubble freely and in which the bubbles break easily after application of the coating and in which the material comprising the bubble films flows around each particle of the aggregate rather than into and filling the voids, and in this manner producing the desired character of porosity and enabling the most efficient sound absorption to be obtained.

I have also discovered that for the production of a most efficient acoustical plaster, i. e. one having most efficient sound absorbing characteristics, it may be desirable to incorporate relatively short lengths of those fibers which do not materially soften when wet with water but which on the contrary retain their elasticity and effectiveness even when wet and admixed with plaster. I have been able to increase the intercommunication between the interstices or spaces between granules and to impart a character of porosity to the mass such as to materially increase the sound absorbing efficiency of the present acoustical material. By the use of short fibers the tendency of the fibers to segregate or roll during mixing is eliminated so that uniform drying throughout the mass is obtained, and furthermore the presence of the fiber in its short length will not interfere with the workability of the plaster or the decorative treatment imparted to it. I prefer to utilize a fiber within a range of from one-fourth to one-half inch in length, and when an acoustical material embodying such a fiber is applied to a surface, such as is illustrated in Figs. 1 and 2 of the drawing, the spaces 10 between the particles are connected by elongated spaces 12 surrounding the individual fibers 14. In addition the fibers also function to prevent the segregation of the granular particles 16 making up the acoustical plaster and decrease the density of the mass so that throughout the mass a continuity of connected and intercommunicating air spaces, pores or cells are produced of varying size but which include the capillary form of space surrounding the fibers, and all of which cooperate to increase markedly the sound absorbing characteristics of the plaster.

While fibers have been used of such materials as hair, hemp, sisal, and other stiff fibers, nevertheless other materials of not a strictly fibrous nature may be used with advantage. For example, relatively large flakes of ground mica ranging in size from 10 to 40 mesh have been used. Incidentally, the fibrous and flaking material by reason of its interlocking nature adds considerably to the strength of the resulting plaster.

One of the desirable characteristics of a coating material for application to a surface is that it should spread easily and have a cohesion without stickiness sufficient to hold it together nicely while at the same time preventing adherence to the trowel or other implement by which it is being applied, and in connection with a plaster this characteristic is spoken of as "fatness" or "plasticity". I have discovered that by incorporating a small amount of fine cork, and preferably cork dust, in a plaster coating material of the character above referred to, I have been able to impart thereto the desired "fatness" and "plasticity" without interfering with the other desired characteristics of the plaster coating composition. In connection with the present acoustical material I prefer to incorporate a small amount of fine cork, preferably cork dust, and in practice varying sizes up to 20 mesh may be used and in an amount not exceeding 5% of the weight of the total mix. I have found that the effect produced is equal to the effect produced by many times the amount of other materials which have heretofore been commonly used to impart this quality to a plaster.

As above described, the present material is particularly adapted for use as a coating material, but it is to be understood that the invention is not limited thereto inasmuch as by selecting the proper particle size, depending upon the use for the product, the material may be used with advantage as a plastic composition for the production of various molded products, for decorative panels and designs, for preformed acoustical blocks, and for various other commercial products for which plastic compositions are now used.

As used throughout the specification and claims, the term "particles" is intended to include the material in various states of sub-division from a powdered form to a granular form.

While the preferred compositions have been herein described, it will be understood that the invention is not specifically limited thereto.

Having thus described the invention, what is claimed is:—

1. An acoustic material characterized by its porosity and sound absorption efficiency, and comprising granules of partially calcined dolomite and inert bodies capable of remaining in relatively stiff condition when subjected to the action of water and of unequal dimensions dispersed throughout the mass of particles whereby to assist in maintaining the particles in separated relation and render the interstices intercommunicating.

2. An acoustical material characterized by its porosity and sound absorption efficiency, and comprising granules of a partially calcined crystalline dolomite, cementitious material for adhesively securing the granules together without filling the voids between them, and elongated inert bodies of a stiff but resilient nature and capable of remaining in such condition when subjected to the action of water, said inert bodies being dispersed throughout the mass for assisting in the formation of intercommunicating interstices between the granules.

3. An acoustical material characterized by its porosity and sound absorption efficiency, and comprising granules of a partially calcined crystalline dolomite, cementitious material for adhesively securing the granules together without filling the voids between them, and a large number of individual relatively short pieces of fibrous material of a stiff resilient nature and affected by water, said bodies being dispersed throughout the mass for assisting in the maintenance of the granules in spaced relation and the formation of intercommunicating interstices.

4. A plastic composition for acoustical purposes comprising dolomitic granules obtained by partially calcining highly crystalline dolomite to a point short of the formation of substantial amounts of lime, said granules being of relatively large size, and cementitious material for superficially adhering said granules together without filling the voids between the granules.

5. A plastic composition for acoustical purposes comprising granules of partially calcined crystalline dolomite, said granules having a crystalline structure comparable to that naturally existing in the uncalcined dolomite, and cementitious material for adhering said granules together without completely filling the voids between the granules.

6. A plastic composition for acoustical purposes comprising granules produced from highly crystalline dolomite calcined short of the formation of substantial quantities of lime and without substantially impairing the crystalline structure thereof, said granules being freely flowable discrete particles of relatively high strength and being of a size such as to be retained on a sixty-mesh screen, and cementitious material for adhering said granules together without completely filling the voids between the granules.

7. A plastic composition for acoustical purposes comprising granules produced from highly crystalline dolomite calcined short of the point of formation of substantial amounts of lime and without substantially impairing the crystalline structure thereof, said granules being freely flowing discrete granules of a size corresponding substantially to the original crystalline size in the uncalcined dolomite, and cementitious material for adhering said granules together without completely filling the voids between the granules.

FRANCIS CLARKE ATWOOD.